US012759659B2

(12) United States Patent
Kaufmann et al.

(10) Patent No.: US 12,759,659 B2

(45) Date of Patent: Oct. 13, 2026

(54) ELECTRIC BIKE AND BATTERY HOLDER

(71) Applicant: Porsche eBike Performance GmbH, Ottobrunn (DE)

(72) Inventors: Oskar Kaufmann, Ottobrunn (DE); Johannes Biechele, Ottobrunn (DE)

(73) Assignee: Porsche eBike Performance GmbH, Ottobrunn (DE)

(*) Notice: Subject to any disclaimer, the term of this patent is extended or adjusted under 35 U.S.C. 154(b) by 323 days.

(21) Appl. No.: 18/557,223

(22) PCT Filed: Feb. 28, 2022

(86) PCT No.: PCT/EP2022/054957

§ 371 (c)(1),
(2) Date: Dec. 27, 2023

(87) PCT Pub. No.: WO2022/228749

PCT Pub. Date: Nov. 3, 2022

(65) Prior Publication Data

US 2024/0208597 A1 Jun. 27, 2024

(30) Foreign Application Priority Data

Apr. 27, 2021 (DE) ........................ 102021110692.3

(51) Int. Cl.
*B62J 43/20* (2020.01)
*B62J 43/13* (2020.01)

(52) U.S. Cl.
CPC ............... *B62J 43/20* (2020.02); *B62J 43/13* (2020.02)

(58) Field of Classification Search
CPC ................................. B62J 43/10; B62J 43/13
See application file for complete search history.

(56) References Cited

U.S. PATENT DOCUMENTS

| | | | | |
|---|---|---|---|---|
| 11,024,917 | B2 * | 6/2021 | Trif | B62M 6/90 |
| 11,325,678 | B2 * | 5/2022 | Wecker | B62K 19/40 |
| 11,502,362 | B2 * | 11/2022 | Searles | B62J 43/20 |
| 12,330,733 | B2 * | 6/2025 | Shahana | B62M 6/55 |
| 2010/0237585 | A1 * | 9/2010 | Binggeli | B62K 19/30 280/288.4 |
| 2019/0291810 | A1 | 9/2019 | Slaoui et al. | |
| 2023/0291051 | A1 * | 9/2023 | Klein | B62J 43/13 |
| 2024/0417018 | A1 * | 12/2024 | Van Nuland | B62M 6/90 |

FOREIGN PATENT DOCUMENTS

| | | | | | |
|---|---|---|---|---|---|
| CN | 204096021 | U | | 1/2015 | |
| CN | 209567029 | U | | 11/2019 | |
| CN | 120664036 | A | * | 9/2025 | B62J 43/13 |

(Continued)

*Primary Examiner* — Kevin Hurley
(74) *Attorney, Agent, or Firm* — Slater Matsil, LLP

(57) ABSTRACT

In an embodiment an electric bicycle includes a bicycle frame with a frame section and a battery holder arranged on the frame section and having two retaining lugs configured to hold a battery on the frame section in a form-fitting manner, wherein the battery holder is configured such that—in a first assembly step—the battery is placeable against a first retaining lug and subsequently—in a second assembly step—is pivotable against the frame section such that the battery comes into engagement with a second retaining lug and is thereby held on the bicycle frame in a form-fitting manner.

18 Claims, 5 Drawing Sheets

(56) References Cited

FOREIGN PATENT DOCUMENTS

| | | | | | |
|---|---|---|---|---|---|
| DE | 202014009732 | U1 | | 12/2014 | |
| DE | 202015103750 | U1 | | 10/2016 | |
| DE | 102015010603 | A1 | * | 2/2017 | .............. B62M 6/90 |
| DE | 102015010818 | A1 | * | 2/2017 | .............. B62M 6/90 |
| DE | 102016010261 | A1 | * | 3/2018 | .............. B62M 6/55 |
| DE | 112019001103 | T5 | | 11/2020 | |
| DE | 102020204882 | A1 | * | 10/2021 | .............. B62J 43/20 |
| DE | 202025103241 | U1 | * | 7/2025 | .......... H01M 50/262 |
| EP | 3932794 | A1 | * | 1/2022 | ............. B62K 19/28 |
| WO | 2016008616 | A1 | | 1/2016 | |
| WO | 2018016949 | A1 | | 1/2018 | |
| WO | WO-2022003257 | A1 | * | 1/2022 | .............. B60L 50/20 |

* cited by examiner

ELECTRIC BIKE AND BATTERY HOLDER

CROSS-REFERENCE TO RELATED APPLICATIONS

This patent application is a national phase filing under section 371 of PCT/EP2022/054957, filed Feb. 28, 2022, which claims the priority of German patent application 102021110692.3, filed Apr. 27, 2021, each of which is incorporated herein by reference in its entirety.

TECHNICAL FIELD

The invention relates to an electric bicycle and a battery holder.

BACKGROUND

Bicycles have long enjoyed great popularity as easy-to-use and emission-free means of transportation. For many years, they have also been widely used as sports and fitness equipment, and particularly suitable types have emerged for various sports applications.

For some years now, there has also been a growing enthusiasm for electric bicycles (especially so-called "pedelecs"). Potential riders are not only older, less fit people or people with no sporting ambitions, but also sporty, younger riders, whether for use on the way to work or because of the possibility of using them to extend the radius of action and/or increase the speed of travel without overstraining their own physique. Among mountain bikers and road cyclists in particular, interest in electrically assisted bicycles seems to be growing.

There are various options for mounting a battery for the electric motor on the bicycle, whereby a robust fixation on the one hand and simple handling on the other must be ensured for the battery. Extreme forces, such as acceleration forces while riding, vibrations and shocks, as well as environmental influences, such as dirt, must be taken into account.

It is desirable to specify a concept for a battery holder which allows a compact design and helps to address the above points.

SUMMARY

Embodiments provide an electric bicycle. The electric bicycle comprises a bicycle frame having a frame section. The electric bicycle further comprises a battery holder, which is arranged on the frame section and comprises two retaining lugs, by which a battery for an electric motor of the electric bicycle is held on the frame section, in particular at least in a form-fitting manner. The battery holder, for example the two retaining lugs, is designed in such a way that—in a first assembly step—the battery can be placed against the first retaining lug and then—in a second assembly step—can be pivoted against the frame section in such a way that the battery comes into engagement with the second retaining lug and is thereby held on the bicycle frame, in particular in a form-fitting manner.

The battery holder according to the invention allows for a lightweight and inexpensive structure. In particular, the holder has only two retaining lugs arranged or fixed to the frame section. As a result, the battery holder enables a mechanically simple structure, requiring little use of materials and a low degree of complexity. The battery holder is thus formed in several parts, but can also be formed in one piece, for example by the two lugs being integrally and fixedly connected. The provision of only two retaining lugs helps to reduce weight and installation space considerably. Furthermore, an ergonomically particularly simple operating concept is made possible, whereby, for example, the battery only has to be attached to the retaining lug and then pivoted against the frame section. This can be done single-handedly by a user. The battery holder can, for example, simply be mounted on the bottom side of the frame section. The battery holder also enables a robust design, for example by appropriate design of the retaining lugs. Furthermore, it is possible that the battery holder is not susceptible to environmental influences, for example when it is mounted to the bottom side of the frame section.

The battery can be detachably, in particular removably, accommodated in the battery holder. In other words, the battery can be mounted or dismounted without tools and without much effort. The battery can thus be easily installed and removed and thus replaced. The battery is held securely by means of the two retaining lugs, for example, in a form-fitting and/or force-fitting manner.

In particular, the retaining lugs allow positive engagement with the battery, for example one or both retaining lugs surround the battery from the outside or engage in a corresponding recess in the battery. The retaining lugs are designed as sheet metal tabs, for example. The retaining lugs can be mounted separately on the frame section, for example, and form the battery holder. The retaining lugs are arranged at a certain distance from one another, so that adaptation to different battery models is possible. The retaining lugs thus make a particular contribution to the flexible mounting of the battery. The two retaining lugs contribute only insignificantly to the total weight of the bike.

The frame section is, for example, a frame section of the bicycle frame that leads to the bottom bracket. For example, it is the seat tube or the down tube. The first retaining lug faces the bottom bracket, for example, while the second retaining lug is arranged facing away from the bottom bracket.

According to one embodiment, the first retaining lug is designed in such a way that the battery can be placed or hooked in during the first assembly step. The battery can then be swiveled around the support area or around the hook-in area. In other words, the battery is at least partially placed on or hooked into the retaining lug. The battery is placed in such a way that a defined pivoting axis can be formed. For example, the battery strikes the retaining lug and rests on it so that a defined pivoting axis is formed. Placing or hooking the battery onto the first retaining lug defines a pivoting axis for the second assembly step. The first retaining lug represents a floating bearing, for example.

The first retaining lug has, for example, a support element or a suspension element. For example, the support element or the suspension element is arranged at a free end of the first retaining lug facing away from the frame section. The support element or the suspension element extends in the direction of the second retaining lug, for example along the frame section away from the bottom bracket. A hook element is also provided, for example, which interacts mechanically, i.e. in a form-fitting manner, with the battery on the corresponding side, for example by gripping underneath, gripping around or the like. The embodiment enables particularly simple mounting of the battery on the battery holder.

According to one embodiment, the second retaining lug is spring-loaded for latching to the battery. This enables simple latching and unlatching of the battery. The battery can therefore be mounted or removed manually, with the second tab, which is designed as a spring tab, being bent accordingly in each case. When the battery is mounted, the spring lug is moved out of its rest position against a spring force by interacting with the battery, i.e. when the latter is pivoted against the frame section, before the battery reaches the final mounting state, in which the spring lug is bent back into an engagement position or the rest position due to the acting spring force, in which the second retaining lug is positively engaged with the battery, i.e. is latched. Conversely, the second retaining lug can be disengaged from the battery by moving it from the engaged position/rest position so that it disengages from the battery and the battery can be removed. For example, the second lug has a latching hook that cooperates with the battery or a battery component (such as housing) accordingly.

According to one embodiment, the battery has a recess or opening into which the second retaining lug is inserted in the second assembly step for positive engagement with the battery. For example, the electric bicycle has the battery that is fixed in a final assembly state, in which the battery is held in the battery holder, in such a way that the second retaining lug dips into the battery, that is, into the battery housing, and engages with the battery inside the battery, in particular interacts with it in a form-fitting manner. For example, the retaining lug has a locking element or a latching hook which, in the final assembly state, interacts mechanically with a corresponding counter-latching element or mating latching hook of the battery. This has the advantage that the second retaining lug does not grip around the battery from the outside, but interacts mechanically with it on the inside for retention and is thus protected from external influences. For example, the positive cooperation of the second retaining lug with the battery takes place in an end region of the battery holder or of the battery facing away from the bottom bracket. In other words, the recess or opening is provided in the end region of the battery holder or battery facing away from the bottom bracket. This has the advantage that the main weight is borne by the first retaining lug when the battery is mounted, so that the battery can be pivoted easily against the frame section. The opening in the battery for the second retaining lug can also be positioned along the battery at another location, such as centrally.

According to one embodiment, the battery has an opening on an outer side facing away from the frame section so that the second retaining lug can be unlocked and the battery removed. The opening is arranged on an bottom side of the battery, for example. The opening is freely accessible from the outside. Thus, the second retaining lug can be actuated from the outside by engaging in the correspondingly provided opening. This makes it particularly easy to unlock and thus remove the battery from the frame section. Since the retaining lug does not grip around the battery at an outer end—with respect to the direction along the frame section—the end of the battery can be gripped with one hand and the retaining lug can be released with the fingers by dipping into the opening. When unlocking, the battery is thus already in the hand of the operator, so that it does not have to be gripped with a second hand and/or can fall down unintentionally.

According to one embodiment, the battery holder is formed in one piece and the two retaining lugs are connected via a holding web. The battery holder thus has a roughly C-shaped design. This enables a solid overall construction. The two retaining lugs are aligned at a defined distance from each other. This allows particularly simple assembly, as the battery holder can be mounted as a unit. Further adjustment of the retaining lugs to each other with regard to the distance is therefore no longer necessary. Alternatively, the battery holder is made up of several components to form an assembly.

According to one embodiment, the web has two mounting sections by which the battery holder is fixed to the frame section, wherein the web has a center web section between the mounting sections, which is formed such that it extends at a distance from the frame section so that a space is formed between the frame section and the center web section.

The two mounting sections extend along a first plane and have support surfaces by means of which the battery holder rests on the frame section. The battery holder is fixed to the frame section in the mounting sections. The center web section extends along a second plane, the second plane being substantially parallel to and spaced from the first plane. In other words, the battery holder has a first mounting section followed by the center web section by means of a step or shoulder before the center web section again transitions to the second mounting section via a step or shoulder extending in the opposite direction. For example, the first and second mounting sections represent end regions of the battery holder. The first retaining lug is formed on the first mounting section or extends outwardly therefrom normal to the first plane. Similarly, the second retaining lug is arranged in the second mounting section or extends outwardly therefrom normal to the first or second plane, respectively.

The intermediate space allows cable lines or the like to be easily stowed or routed in it without colliding with the battery itself. In addition or alternatively, one or more tools can also be stowed in the intermediate space. The tools may be, for example, a quick repair kit for the electric bicycle. When the battery is mounted, the intermediate space is covered or protected by the battery itself. In other words, the battery is designed in such a way that, in the final assembled state, it largely to completely encloses the intermediate space and closes it off together with the frame section. This makes access from the outside difficult or even impossible.

According to one embodiment, the battery holder is made of metal, plastic or a composite material, in particular a fiber composite material. In particular, the battery holder is manufactured as a metal sheet. For example, the battery holder has a wall thickness of only a few millimeters, for example less than 5 mm, preferably 3 mm or less. This contributes to the fact that the battery holder is a particularly light but nevertheless stable overall structure. In particular, the sheet-like structure can compensate for or absorb vibrations and shocks well.

According to one embodiment, a lock is arranged on the frame section or the battery holder so that the battery can be locked to the frame section when mounted. The lock provides protection against theft. The lock locks the battery to the frame section so that removal, for example by unlocking the second tab, is prevented.

According to one embodiment, the battery holder has an electrical contact element which is designed to ensure electrical contact between the battery and the battery holder when the battery is mounted. In particular, a floating bearing of the contact element is suitable for ensuring friction-free contacting. This compensates for tolerances, "an improperly guided battery" or the like. The contact element can ensure that the battery is properly mounted, for example.

Further embodiments provide a battery holder for an electric bicycle. The battery holder substantially enables the aforementioned advantages and functions. The further development described above, in particular concerning the battery holder, apply analogously.

Further embodiments, advantages and functions are explained in the following description of embodiment examples with the aid of the attached figures. Identical, similar or similarly acting elements may be provided with the same reference signs in the figures.

DETAILED DESCRIPTION OF ILLUSTRATIVE EMBODIMENTS

Figure 1:
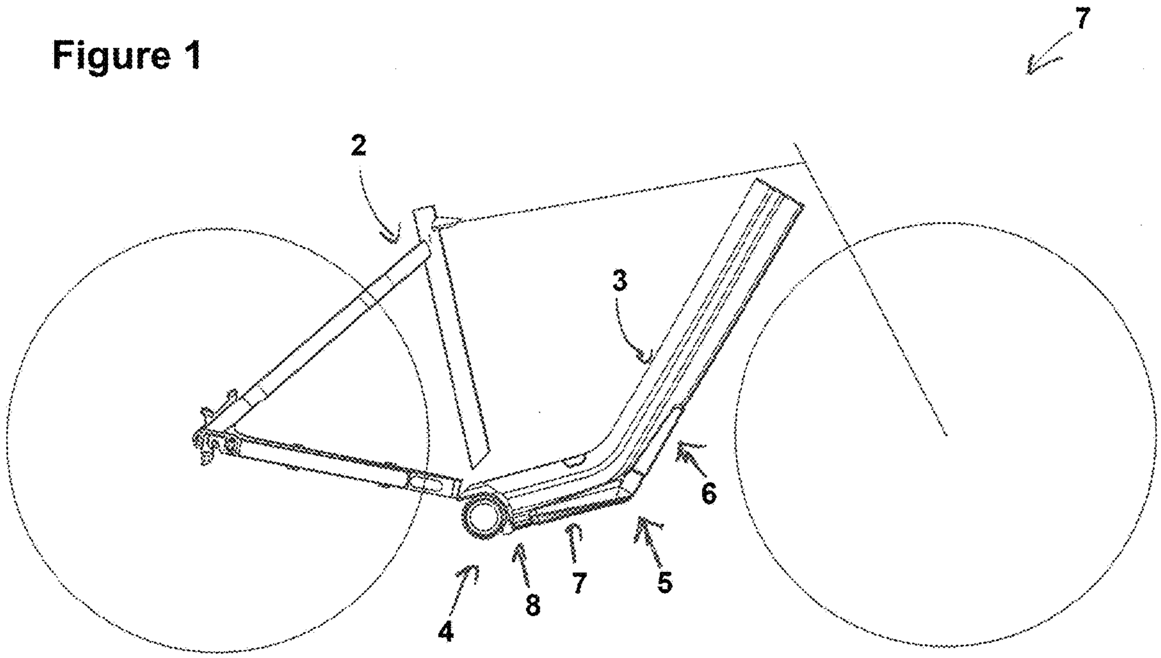
FIG. 1 shows a schematic view of an electric bicycle.

FIG. 1 shows an example of a schematic bicycle 1, which is an electric bicycle. The bicycle 1 has a bicycle frame 2, which is formed, among other things, by a frame section 3. The frame section 3 in the embodiment example is a down tube. The frame section 3 or the down tube extends from the head tube (corresponds to the frame section on which the steering wheel is mounted, only indicated in FIG. 1 and without reference signs) in the direction of a bottom bracket 4 and has a curved course.

A drive device 5 is arranged on and/or in the down tube 3. The drive device 5 is mounted on an bottom side of the down tube 3, for example in an open tube section. Among other things, the drive device comprises an energy storage device 6 in the form of a battery or accumulator, an electric motor 7 and a transmission 8, which are electrically and/or mechanically coupled to one another. The drive device 5 is arranged and configured on the down tube 3 and the bottom bracket 4 such that it can transmit a power of the electric motor 7, which is supplied with energy from the energy storage device 6, to an output shaft for driving the bicycle 1 via the transmission 8 (not shown). The output shaft is, for example, non-rotatably connected to a chainring for driving the bicycle. The output shaft is, for example, a hollow shaft arranged around the pedal crank, i.e. coaxial with the pedal crank axis. The bicycle 1 also has a pedal crank for manually driving the bicycle 1.

At this point, it should be noted that further details of the bicycle 1. The bicycle 1 shown may have other designs. The arrangement and design of the drive device 5 is also different in other embodiments (see also the further figures), as long as this serves to drive the bicycle 1. Furthermore, the battery 6 may be placed at a different position.

In the following, a battery holder, the battery and its assembly or disassembly according to an embodiment of the invention are discussed in detail.

Figure 2:
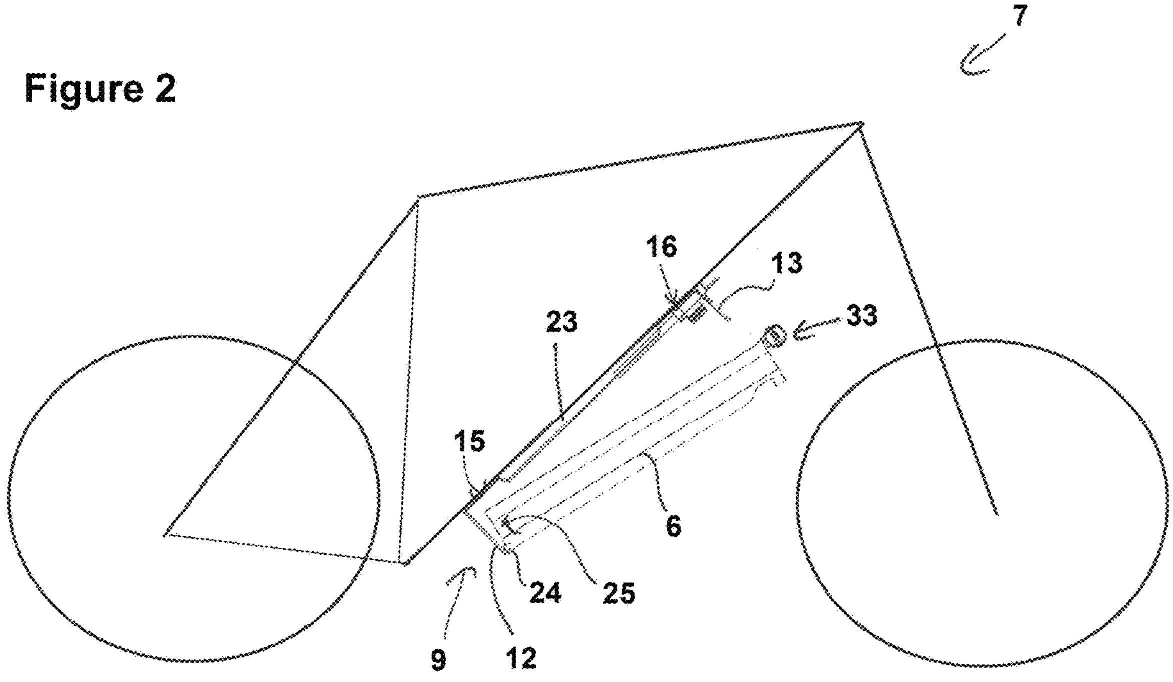
FIG. 2 shows a schematic view of an electric bicycle according to an embodiment of the invention in a first mounting state of a battery in a battery holder.
Figure 3:
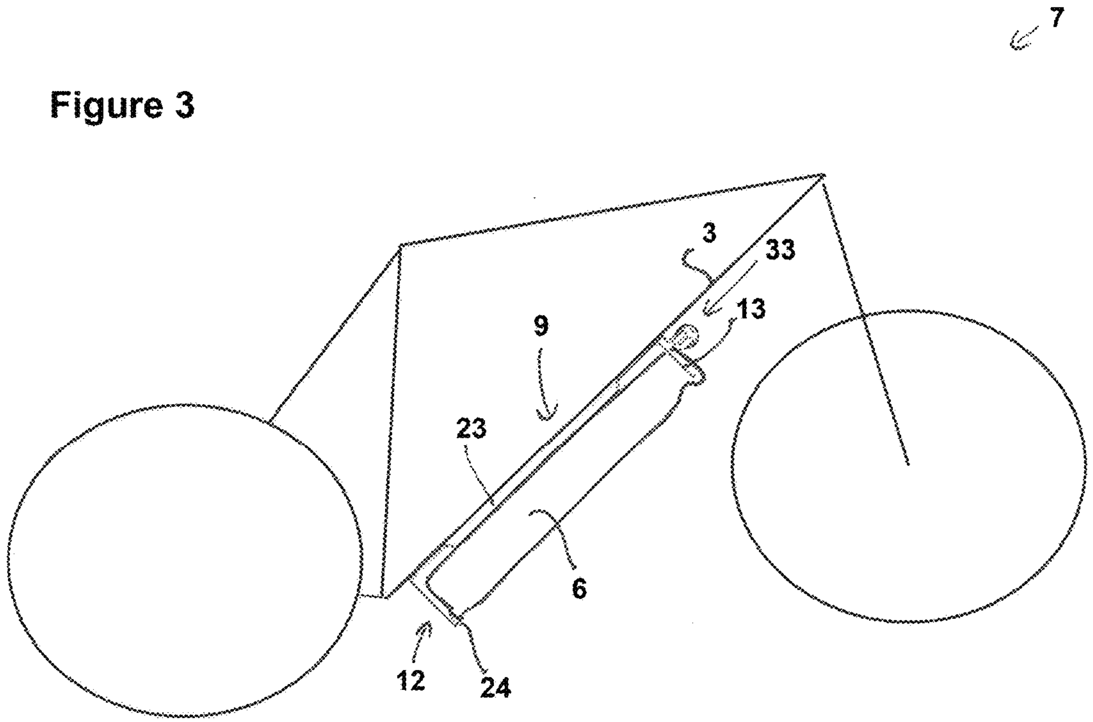
FIG. 3 shows a schematic view of the electric bicycle according to the embodiment example of the invention in a final battery assembly state.
Figure 4:
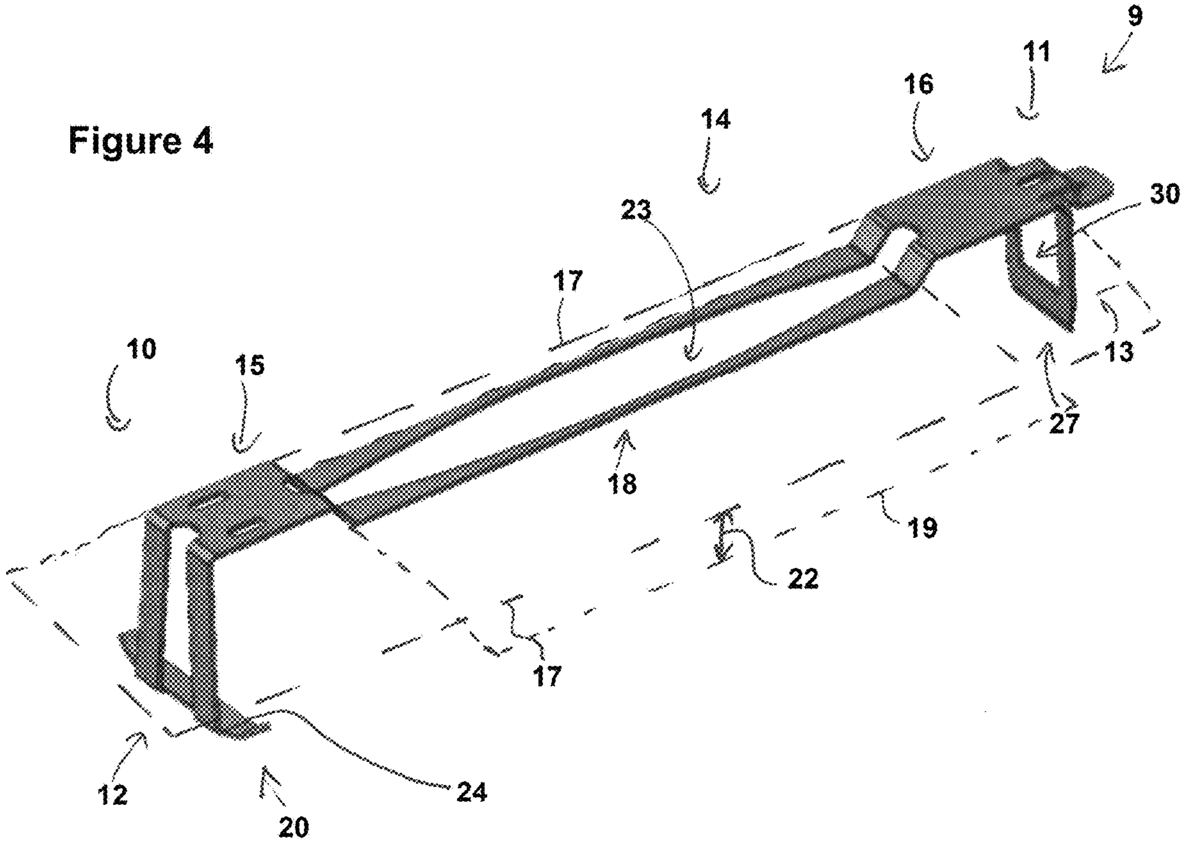
FIG. 4 shows a perspective view of the battery holder.

FIGS. 2 and 3 show an electric bicycle 1 according to an embodiment of the invention, wherein two mounting states of a battery 6 on the electric bicycle 1 are shown. The electric bicycle 1 has a battery holder 9, which is shown isolated in perspective in FIG. 4.

The battery holder 9 is made of a metal sheet and has a substantially C-shaped configuration. The battery holder 9 has a first end 10 and a second end 11. At the first end 10, the battery holder 9 has a first retaining lug 12, while at the second end 11, the battery holder 9 has a second retaining lug 13. The second retaining lug 13 is configured as a resilient tab. The two retaining lugs 12 and 13 are connected to each other by a web 14. The web 14 has at the ends 10 and 11, which may also be referred to as end regions, a first mounting section 15 and a second mounting section 16, respectively, at which the two tabs 12 and 13 are arranged, in the example each bent substantially vertically. Generally speaking, the retaining lugs 12 and 13 extend normal to a first main extension plane 17 in or along which the two mounting sections 15 and 16 extend.

The two mounting sections 15 and 16 are connected to each other by a center web section 18 extending in or along a second main extension plane 19 which is substantially parallel to the first main extension plane 17 and is offset from the first main extension plane 17 at a distance in the direction of outer free ends 20 and 21, respectively, of the two retaining lugs 12 and 13. The two main extension planes 17 and 19 are spaced from each other by a predetermined distance 22 in the normal direction. By this measure, a kind of intermediate space or free space 23 is formed between the two main extension planes 17 and 19 in the region of the center web section 18, which will be discussed in more detail. In the region of the mounting sections 15 and 16, the battery holder 9 is mounted on the down tube 3, that is the frame section, for example in a recess. The retaining lugs 12 and 13 project downwardly away from the down tube 3. The first retaining lug 12 has a support element 24 at its free end 20.

In the assembly state shown in FIG. 2, the lower end 25 of the battery 6 is positively attached to the first retaining lug 12 in an assembly step in such a way that the battery 6 rests on the support element 24 in the area of its lower end 25. The battery 6 is attached at an angle to the frame section 3 at a predetermined angle. The support element 24 defines a lower stop and thus a pivoting axis for the battery 6.

Subsequently, in a second assembly step, the battery 6 is pivoted against the frame section 3 from below about the pivoting axis so that the second retaining lug 13 can interact positively with the battery 6 in such a way that the battery 6 is securely held mechanically on the down tube 3. This condition is shown schematically in FIG. 3.

Figure 5:
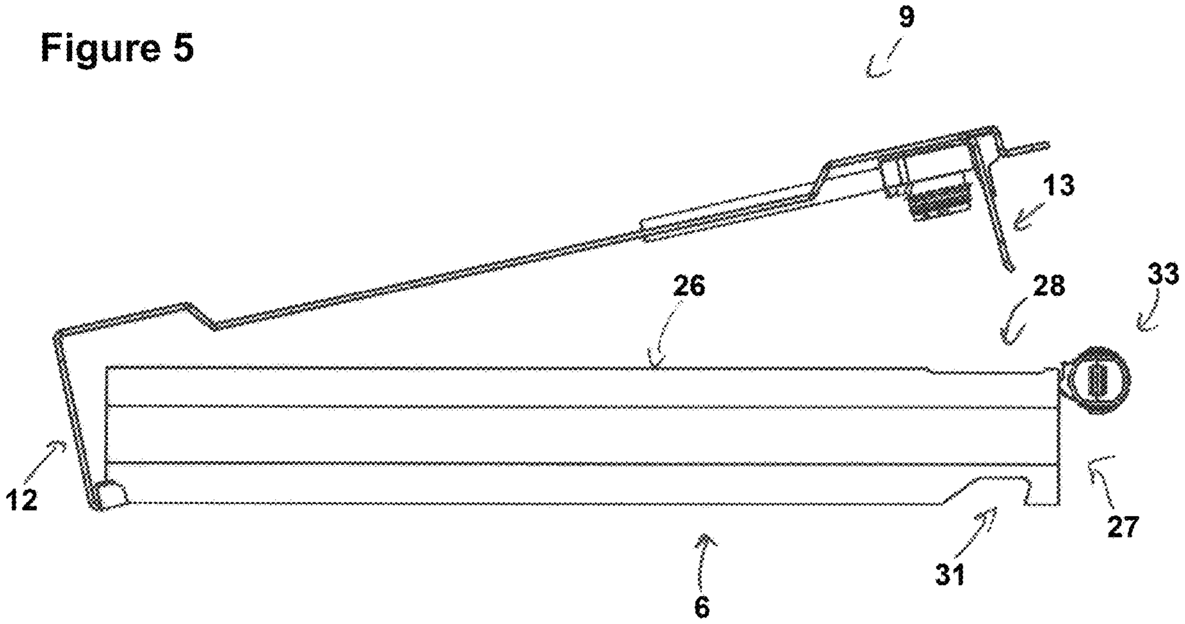
FIGS. 5 to 9 show different views of the battery holder with battery.
Figure 6:
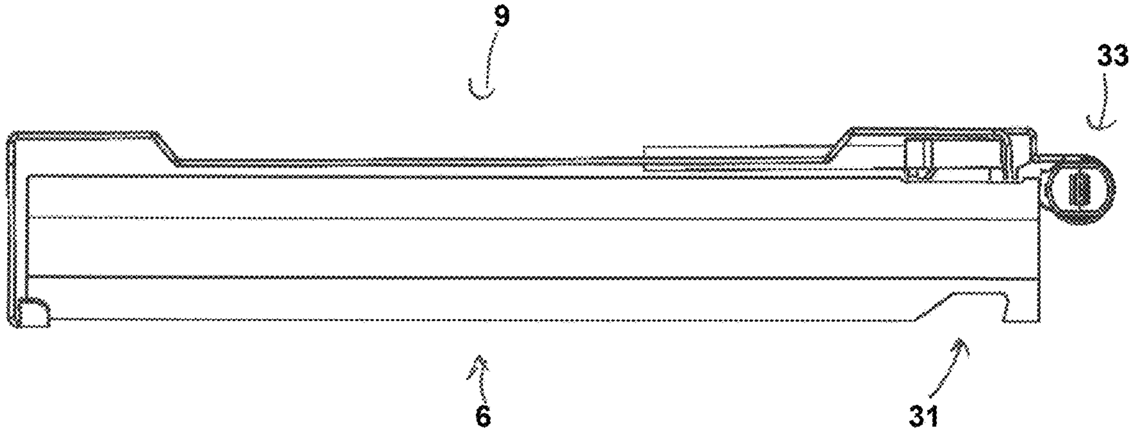

FIGS. 5 and 6 show the two assembly states in magnified views, with the battery 6 and battery holder 9 shown isolated from the bicycle 1.

Figure 7:
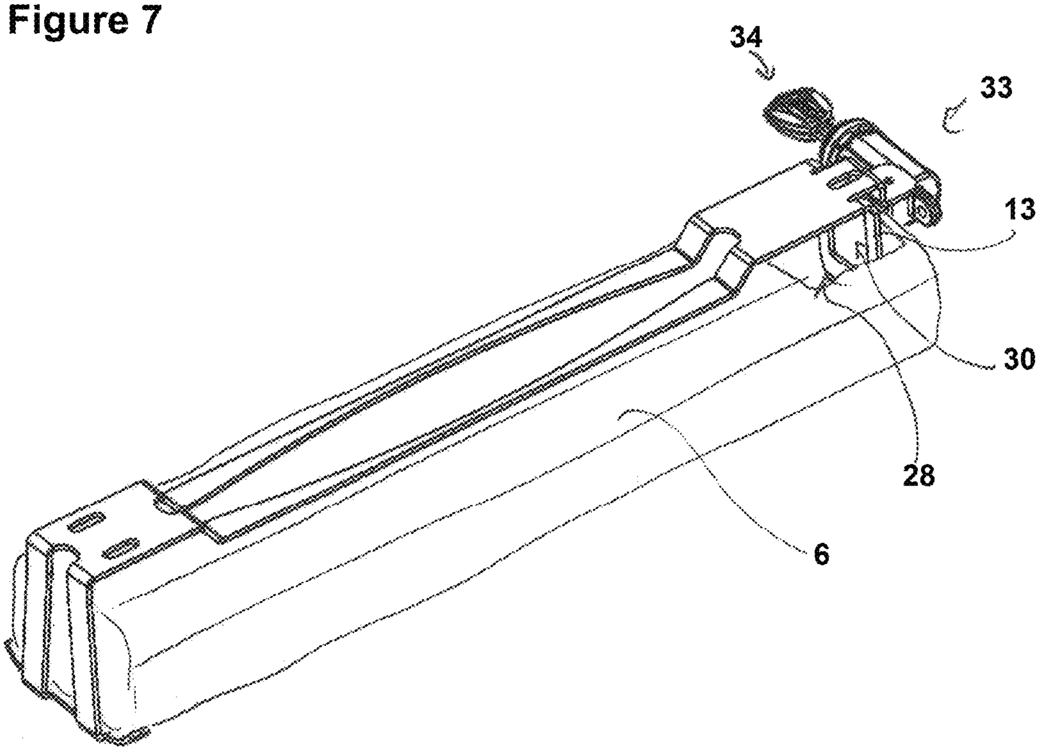
Figure 8:
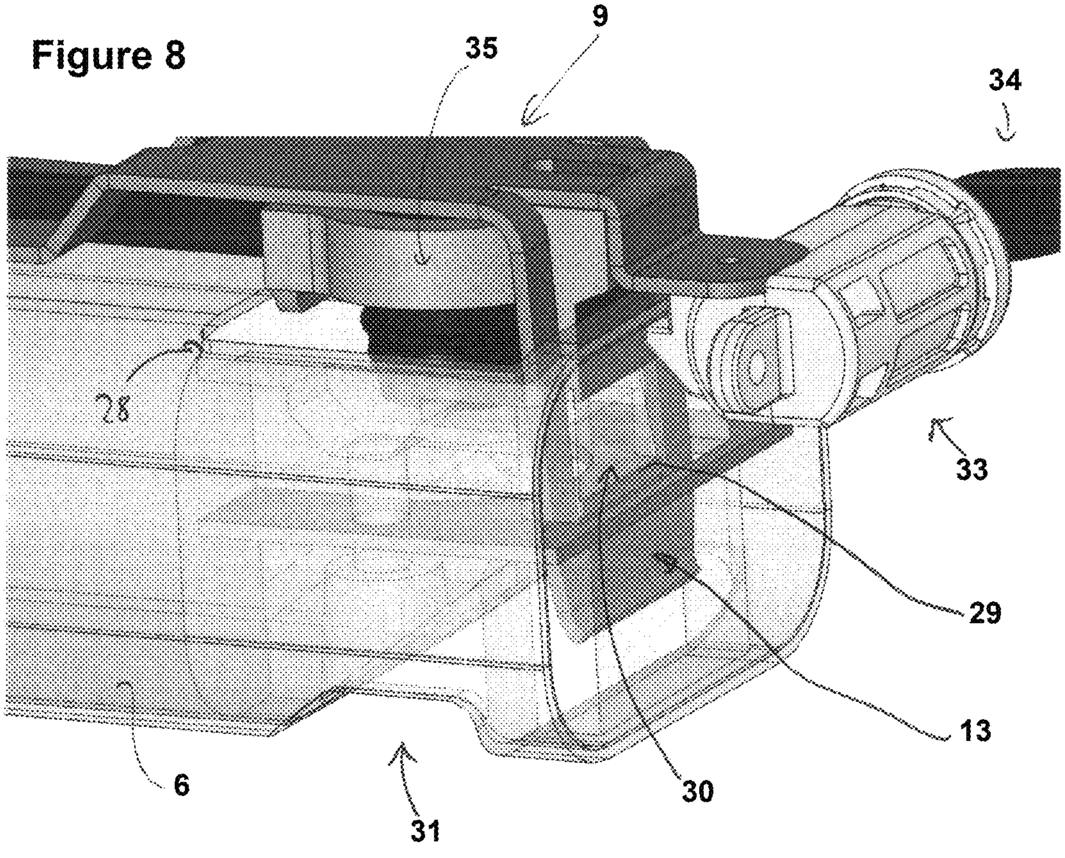
Figure 9:
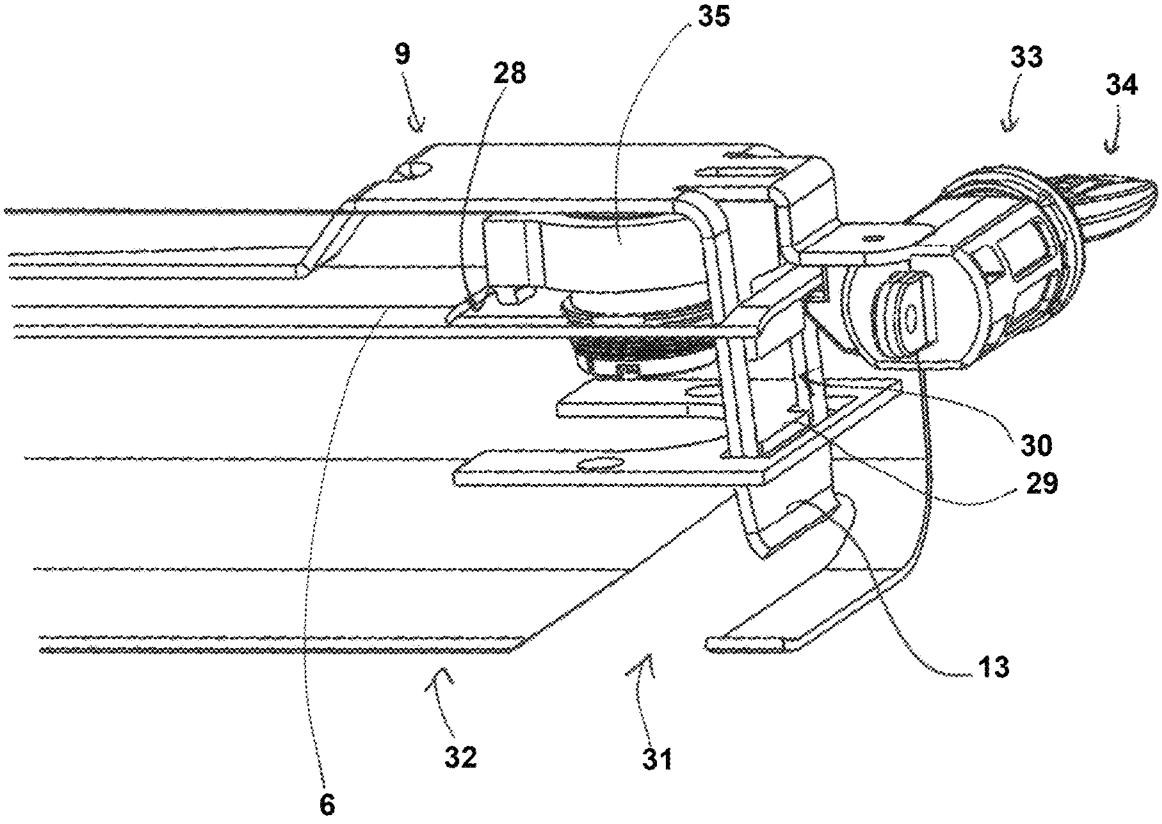

For fixing to the battery holder 9, the battery 6 has an opening 28 on its upper side 26 facing the battery holder 9 in the region of an upper longitudinal end 27 of the battery 6. The opening 28 is configured to allow the second retaining lug 13 to enter the opening 28 in the second assembly step, as shown in FIG. 6. FIGS. 7 to 9 also show that the second retaining lug 13 is immersed in the opening 28 of the battery 6. In the immersed state, i.e. in particular in a final installation state of the battery 6, the second resilient retaining lug 13 latches with a corresponding counter-latching element 29. For this purpose, a free end 21 of the second retaining lug 13 is optionally formed to be slightly rounded outwards, so that when the battery 6 is pressed in against the battery holder 9, the second retaining lug 13 is correspondingly bent away outwards and then springs back in an original state in which the counter-latching element 29 is gripped behind by the second retaining lug 13.

In the embodiment example, the second retaining lug 13 has a latching opening 30 for this purpose, into which the counter-latching element 29 is inserted with a latching lug. Many other latching mechanisms and designs are also conceivable, which are not described here. An essential advantage of the solution shown is that the locking or latching of the second retaining lug 13 with the battery 6 takes place inside the battery 6 or the housing of the battery 6. The mechanical locking, i.e. the positive cooperation of the second retaining lug 13 with the battery 6 is thus inside the battery 6 and thus protected from involuntary loosening or impacts from the environment. Opposite the opening 28, the battery 6 has a further opening, namely an unlocking opening 31. Via the unlocking opening 31, which is formed on the bottom side 32 of the battery 6, the spring lug 13 can be manually actuated and released from the counter-latching element 29, so that the battery 6 can be removed from the battery holder 9. Due to the fact that the second retaining lug 13 does not grip around or hold the battery 6 from the outside, but rather interacts with the battery 6 on the inside by dipping into the opening 28, when the battery 6 is removed by actuating the spring tab 13, the battery 6 can fall directly into the hand of the operator. This represents a significant unlocking and operating convenience for a user.

A further aspect of the embodiment shown is a lock 33. The lock 33 is attached to the frame section 3 or the battery holder 9 and serves to lock the battery 6 in the mounted state on the frame section 3. As can be seen in particular from FIGS. 8 and 9, the lock 3 is a conventional lock in which a locking bolt or generally a locking element is operable between an unlocked and a locked position by means of a key 34. In the locked position, the locking element positively engages the battery 6 or a portion of the battery 6 such that removal of the battery 6 from the battery holder 9 is blocked even when the second retaining lug 13 is unlocked. Embodiments of the lock 33 may be arbitrary, and the lock 33 is not limited to the embodiment shown in the figures.

Optionally, an electrical contact element 35 is provided (see, for example, FIGS. 9 and 8), by means of which electrical contact between the battery holder 9 and the battery 6 is ensured in the assembled state of the battery 6. In the embodiment example, the electrical contact element 35 is floatingly mounted in order to compensate for tolerances or inaccuracies in the manufacture of the battery 6.

The invention claimed is:

1. An electric bicycle comprising:

a bicycle frame with a frame section; and a battery holder arranged on the frame section and having two retaining lugs configured to hold a battery on the frame section in a form-fitting manner, wherein the battery holder is configured such that—in a first assembly step—the battery is placed against a first retaining lug and subsequently—in a second assembly step—is pivoted against the frame section such that the battery comes into engagement with a second retaining lug and is thereby held on the frame section in the form-fitting manner, wherein the second retaining lug is resiliently configured for locking the battery, wherein the battery has a recess or an opening into which the second retaining lug—in the second assembly step—engages for a form-fitting engagement with the battery, and wherein the recess or the opening is arranged at an outer side of the battery facing away from the frame section so that the second retaining lug is actuatable and unlockable from the outer side, thereby allowing the battery to be removed.

2. The electric bicycle according to claim 1, wherein the first retaining lug is formed such that the battery is placed on or hooked in during the first assembly step.

3. The electric bicycle according to claim 1, wherein the battery holder is one piece and the two retaining lugs are connected via a web.

4. The electric bicycle according to claim 3, wherein the web comprises two mounting sections configured to be fixed to the frame section, wherein the web comprises a center web section between the mounting sections, and wherein the center web section extends at a distance from the frame section so that an intermediate space is formed between the frame section and the center web section.

5. The electric bicycle according to claim 1, wherein the battery holder is made of a metal sheet.

6. The electric bicycle according to claim 1, further comprising a lock arranged on the frame section or the battery holder so that the battery is lockable to the frame section in a mounted state.

7. The electric bicycle according to claim 1, wherein the battery holder has an electrical contact element configured to ensure electrical contact between the battery and the battery holder in a mounted state of the battery.

8. A battery holder comprising:

two retaining lugs connected by a web and configured to hold a battery on a frame section of an electric bicycle, wherein a first retaining lug is designed such that—in a first assembly step—the battery is placed against the first retaining lug and subsequently—in a second assembly step—is pivoted against the web such that the battery comes into engagement with a second retaining lug for holding the battery on the frame section, wherein the second retaining lug is resiliently configured for locking the battery, wherein the battery has a recess or an opening into which the second retaining lug—in the second assembly step—engages for a form-fitting engagement with the battery, and wherein the recess or the opening is arranged at an outer side of the battery facing away from the web so that the second retaining lug is actuatable and unlockable from the outer side, thereby allowing the battery to be removed.

9. The battery holder according to claim 8, wherein the first retaining lug is formed such that the battery is placed on or hooked in during the first assembly step.

10. The battery holder according to claim 8, wherein the web comprises two mounting sections configured to be fixed to the frame section, wherein the web comprises a center web section between the mounting sections, and wherein the center web section extends at a distance from the frame section so that an intermediate space is formed between the frame section and the center web section.

11. The battery holder according to claim 8, wherein the battery holder is one piece and is made from a metal sheet.

12. The battery holder according to claim 8, further comprising a lock arranged on the frame section or the battery holder so that the battery is lockable to the frame section in a mounted state.

13. The battery holder according to claim 8, wherein the battery holder has an electrical contact element configured to ensure electrical contact between the battery and the battery holder in a mounted state of the battery.

14. An electric bicycle comprising:

a bicycle frame with a frame section; and a battery holder arranged on the frame section and having two retaining lugs configured to hold a battery on the frame section in a form-fitting manner, wherein the battery holder is configured such that—in a first assembly step—the battery is placed against a first retaining lug and subsequently—in a second assembly step—is pivoted against the frame section such that the battery comes into engagement with a second retaining lug and is thereby held on the bicycle frame in the form-fitting manner, wherein the battery holder is one piece and the two retaining lugs are connected via a web, wherein the web comprises two mounting sections configured to be fixed to the frame section, wherein the web comprises a center web section between the mounting sections, and wherein the center web section extends at a distance from the frame section so that an intermediate space is formed between the frame section and the center web section.

15. The electric bicycle according to claim 14, wherein the first retaining lug is formed such that the battery is placed on or hooked in during the first assembly step.

16. The electric bicycle according to claim 14, wherein the battery holder comprises a metal sheet.

17. The electric bicycle according to claim 14, further comprising a lock arranged on the frame section or the battery holder so that the battery is lockable to the frame section in a mounted state.

18. The electric bicycle according to claim 14, wherein the battery holder has an electrical contact element configured to ensure electrical contact between the battery and the battery holder in a mounted state of the battery.

* * * * *